(12) United States Patent
Choi (10) Patent No.: US 9,346,457 B2
(45) Date of Patent: May 24, 2016

(54) GEARING CONTROL METHOD FOR AUTOMATIC GEAR MECHANISM

(71) Applicant: HYUNDAI KEFICO CORPORATION, Gyeonggi-do (KR)

(72) Inventor: Yoon-Joon Choi, Gyeonggi-do (KR)

(73) Assignee: HYUNDAI KEFICO CORPORATION, Gyeonggi-do (KR)

( * ) Notice: Subject to any disclaimer, the term of this patent is extended or adjusted under 35 U.S.C. 154(b) by 107 days.

(21) Appl. No.: 14/352,667

(22) PCT Filed: Oct. 18, 2012

(86) PCT No.: PCT/KR2012/008503
§ 371 (c)(1),
(2) Date: Apr. 17, 2014

(87) PCT Pub. No.: WO2013/058556
PCT Pub. Date: Apr. 25, 2013

(65) Prior Publication Data
US 2014/0243150 A1    Aug. 28, 2014

(30) Foreign Application Priority Data

Oct. 18, 2011  (KR) .......................... 10-2011-0106384

(51) Int. Cl.
*B60W 10/115* (2012.01)
*B60W 10/02* (2006.01)
*F16H 61/06* (2006.01)
*F16H 3/72* (2006.01)
*F16H 59/36* (2006.01)

(52) U.S. Cl.
CPC ............. *B60W 10/115* (2013.01); *B60W 10/02* (2013.01); *F16H 61/06* (2013.01); *F16H 3/728* (2013.01); *F16H 2059/366* (2013.01); *Y10T 477/641* (2015.01)

(58) Field of Classification Search
CPC .. B60W 10/115; F16H 61/04; F16H 61/0403; Y10T 477/33; Y10T 477/633; Y10T 477/637; Y10T 477/641
See application file for complete search history.

(56) References Cited

U.S. PATENT DOCUMENTS

| 7,850,573 B2 | 12/2010 | Jeon et al. |
| 7,914,417 B2 * | 3/2011 | Lee ................................ 477/148 |
| 2007/0107956 A1 | 5/2007 | Matsubara et al. |

(Continued)

FOREIGN PATENT DOCUMENTS

| CN | 1951742 | 4/2007 |
| CN | 101118016 | 2/2008 |
| JP | 2004-150549 A | 5/2004 |
| JP | 2005016586 | 1/2005 |
| JP | 2006-090347 A | 4/2006 |

(Continued)

OTHER PUBLICATIONS

Office Action of Chinese Patent Office dated Apr. 3, 2015, in Application No. 201280051532.7.

*Primary Examiner* — Huan Le
(74) *Attorney, Agent, or Firm* — Wells St. John P.S.

(57) ABSTRACT

Disclosed herein is a method for controlling gear shifting of an automatic transmission from an N gear stage to an N' gear stage. The gear shifting is embodied by means of engaging and releasing friction elements. The method includes selecting at least two among an rpm of a turbine, an rpm of a first motor generator (MG1), an rpm of a second motor generator (MG2) and an rpm of a planetary gear set as control factors, and controlling engagement and release of the friction elements using the control factors.

5 Claims, 5 Drawing Sheets

(56) References Cited

U.S. PATENT DOCUMENTS

| | | |
|---|---|---|
| 2008/0026906 A1 | 1/2008 | Jeon |
| 2009/0118049 A1 | 5/2009 | Lee |
| 2009/0131220 A1 | 5/2009 | Jeon |
| 2009/0312128 A1 | 12/2009 | Kim et al. |

FOREIGN PATENT DOCUMENTS

| | | |
|---|---|---|
| JP | 2008-032223 A | 2/2008 |
| KR | 10-2009-0050274 A | 5/2009 |
| KR | 10-0903322 B1 | 6/2009 |
| KR | 10-0969366 B1 | 7/2010 |

* cited by examiner (PRIOR ART)
FIG. 1

GEARING CONTROL METHOD FOR AUTOMATIC GEAR MECHANISM

CROSS REFERENCE TO RELATED APPLICATION

This is a 35 U.S.C. §371 application of, and claims priority to, International Application No. PCT/KR2012/008503, which was filed on Oct. 18, 2012, which claims priority to Korean Patent Application No. KR 10-2011-0106384, which was filed on Oct. 18, 2011, the entirety of all the applications are incorporated herein by reference.

TECHNICAL FIELD

The present invention relates to methods for controlling gear shifting of automatic transmissions. More particularly, the present invention relates to a method for controlling gear shifting of an automatic transmission which can precisely control engagement and release of friction elements for gear shifting using various control factors of the automatic transmission.

This application claims the benefit of Korean Patent Application No. 10-2011-0106384, filed Oct. 18, 2011, which is hereby incorporated by reference in its entirety into this application.

BACKGROUND ART

Generally, transmissions for hybrid vehicles use a system in which two motor generators, that is, a first motor generator (hereinafter, referred to as 'MG1') and a second motor generator (hereinafter, referred to as 'MG2'), and an engine are connected to a planetary gear set so that continuously variable shifting can be automatically conducted by controlling the MG1 and the MG2.

Particularly, in a step type automatic transmission system using planetary gears, each gear stage has a specific gear ratio (an input speed/an output speed), and gears are automatically shifted between gear stages. To embody the gear stages, hydraulic pressure of a clutch or friction elements, i.e., a break mechanism, are controlled. Gear shifting is automatically conducted by controlling hydraulic pressures of the friction elements and engaging or releasing the friction elements or performing the engagement and release of the friction elements at the same time.

In the conventional step type automatic transmission system, the input speed and the output speed of the transmission form a predetermined speed ratio in response to a corresponding gear shift ratio. While a gear shift ratio is converted into another gear shift ratio, the output speed is constant, but the input speed is varied to convert the gear shift ratio from the existing ratio to a subsequent ratio. Therefore, the conventional automatic transmission system uses only the input speed of the transmission as a control factor when shifting gears and controls engagement and release of the corresponding friction elements.

A related conventional art was proposed in Korean Patent Registration No. 10-0969366 (Publication date: Jul. 9, 2010, hereinafter referred to as 'patent document 1'), entitled "METHOD FOR CONTROLLING GEAR SHIFTING OF AUTOMATIC TRANSMISSION". This conventional art provides a technique for controlling gear shifting in such a way as to control the engagement and release of friction elements when skip shifting of the automatic transmission that skips three gear ratio steps from a 6th gear stage to a 3rd gear stage is conducted.

Figure 1:
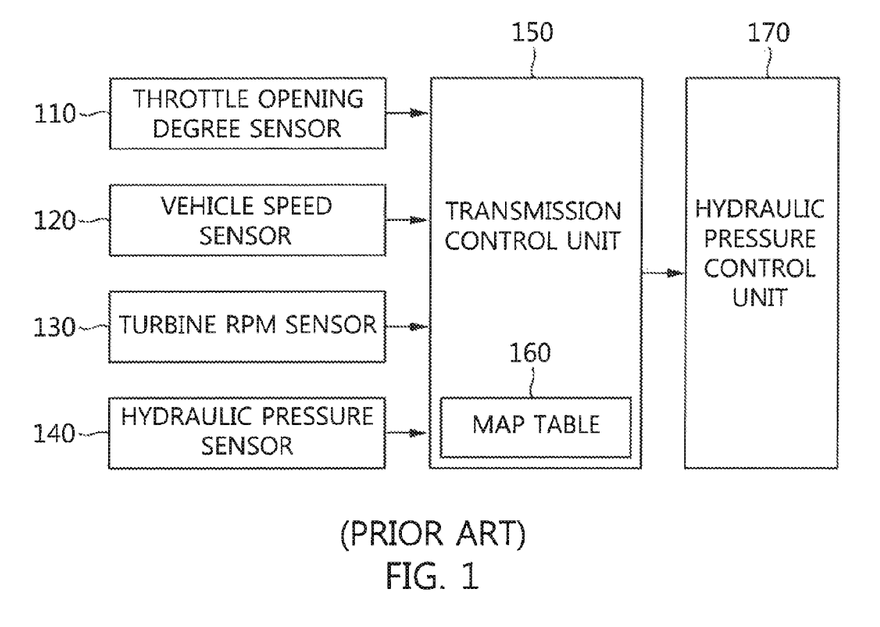
FIG. 1 is a block diagram showing a system for conducting a method for controlling gear shifting of an automatic transmission according to a conventional technique.

FIG. 1 is a block diagram showing a system for conducting a method for controlling gear shilling of an automatic transmission according to patent document 1.

As shown in FIG. 1, the system for conducting the gear shifting control method according to patent document 1 includes a throttle opening degree sensor 110, a vehicle speed sensor 120, a turbine rpm sensor 130, a hydraulic pressure sensor 140, a transmission control unit 150 and a hydraulic pressure control unit 170. In the technique for controlling gear shifting of the automatic transmission according to patent document 1, so as to shift gears from a current N gear stage in which the vehicle is traveling to an N-3 gear stage, the transmission control unit 150 uses only the rpm of a turbine which is sensed from the turbine rpm sensor 130. In other words, it uses only one control factor to control engagement and release of the friction elements. Therefore, precise control for engagement and release of the friction elements when shifting gears is limited. In the gear shifting control method according to patent document 1, engagement and release of the friction elements are consecutively conducted rather than being performed at the same time. Thus, it is difficult to simultaneously and individually control hydraulic pressures applied to the friction elements.

Particularly, in the case of automatic gear shifting using an electronically controlled continuously variable transmission (ECVT), because a transmission input speed and a transmission outlet speed of each gear stage may vary rather than being at a constant gear ratio, if only the transmission inlet speed is used as a control factor, it becomes impossible to control the engagement and release of the friction elements when the gears are shifted.

DISCLOSURE

Technical Problem

Accordingly, the present invention has been made keeping in mind the above problems occurring in the prior art, and an object of the present invention is to provide a gear shift technique of an automatic transmission which can precisely control the engagement and release of friction elements using a variety of control factors rather than using only one control factor, that is, a transmission inlet speed, in a step-type automatic transmission system.

Another object of the present invention is to provide a gear shift technique of an automatic transmission which makes it possible to simultaneously and individually control hydraulic pressures applied to the friction elements for gear shifting rather than consecutively controlling them.

Technical Solution

In order to accomplish the above object, the present invention provides a method for controlling gear shifting of an automatic transmission from an N gear stage to an N' gear stage, the gear shifting being embodied by engaging and releasing friction elements, the method including selecting at least two among an rpm of a turbine, an rpm of a first motor generator (MG1), an rpm of a second motor generator (MG2) and an rpm of a planetary gear set as control factors, and controlling engagement and release of the friction elements using the control factors.

The method may further include setting a first synchronous speed and a second synchronous speed for controlling the engagement and release of the friction elements using the two control factors selected from among the rpm of the turbine, the rpm of the first motor generator (MG1), the rpm of the second motor generator (MG2) and the rpm of the planetary gear set, the first and second synchronous speeds being different from each other.

When a signal of shilling gears from the N gear stage embodied by engagement of the first and second friction elements to the N' gear stage embodied by engagement of the third and fourth friction elements is input, the release of the first friction element and the engagement of the third friction element may begin, and the release of the second friction element and the engagement of the fourth friction element may begin.

The release of the first friction element and the engagement of the third friction element may begin at a same time, and the release of the second friction element and the engagement of the fourth friction element may begin at a same time.

When the first synchronous speed reaches a first gear shift synchronous point, the release of the first friction element and the engagement of the third friction element may be completed.

When the second synchronous speed reaches a second gear shift synchronous point, the release of the second friction element and the engagement of the fourth friction element may be completed.

With respect to the first synchronous speed, a target point of a progression degree of first gear shifting may be set, and the release of the first friction element and the engagement of the third friction element may be controlled based on determining whether the first synchronous speed reaches the target point of the progression degree of the first gear shifting, and with respect to the second synchronous speed, a target point of a progression degree of second gear shifting may be set, and the release of the second friction element and the engagement of the fourth friction element may be controlled based on determining whether the second synchronous speed reaches the target point of the progression degree of the second gear shifting.

Advantageous Effects

According to the present invention, when controlling gear shifting of an automatic transmission, a variety of control factors are used so that corresponding friction elements for gear shifting can be controlled more precisely.

Unlike the conventional technique in which when shifting gears the friction elements are consecutively controlled, a first synchronous speed and a second synchronous speed, which are set from different control factors, are designated as being different speeds and are controlled. Therefore, the friction elements can be simultaneously and individually controlled.

Furthermore, in the case of an automatic transmission using an ECVT system, the degree of progression of gear shifting can be calculated and used to control the friction elements, whereby the friction elements can be controlled in detail even when gears are being shifted.

BEST MODE

Hereinafter, an embodiment of the present invention will be described in detail with reference to the attached drawings. If in the specification, detailed descriptions of well-known functions or configurations would unnecessarily obfuscate the gist of the present invention, the detailed descriptions will be omitted. The embodiment of the present invention aims to help those with ordinary knowledge in this art more clearly understand the present invention. Therefore, the size of each element, the thickness of lines illustrating the element, etc. may be exaggeratedly expressed in the drawings for the sake of understanding the present invention.

Figure 2:
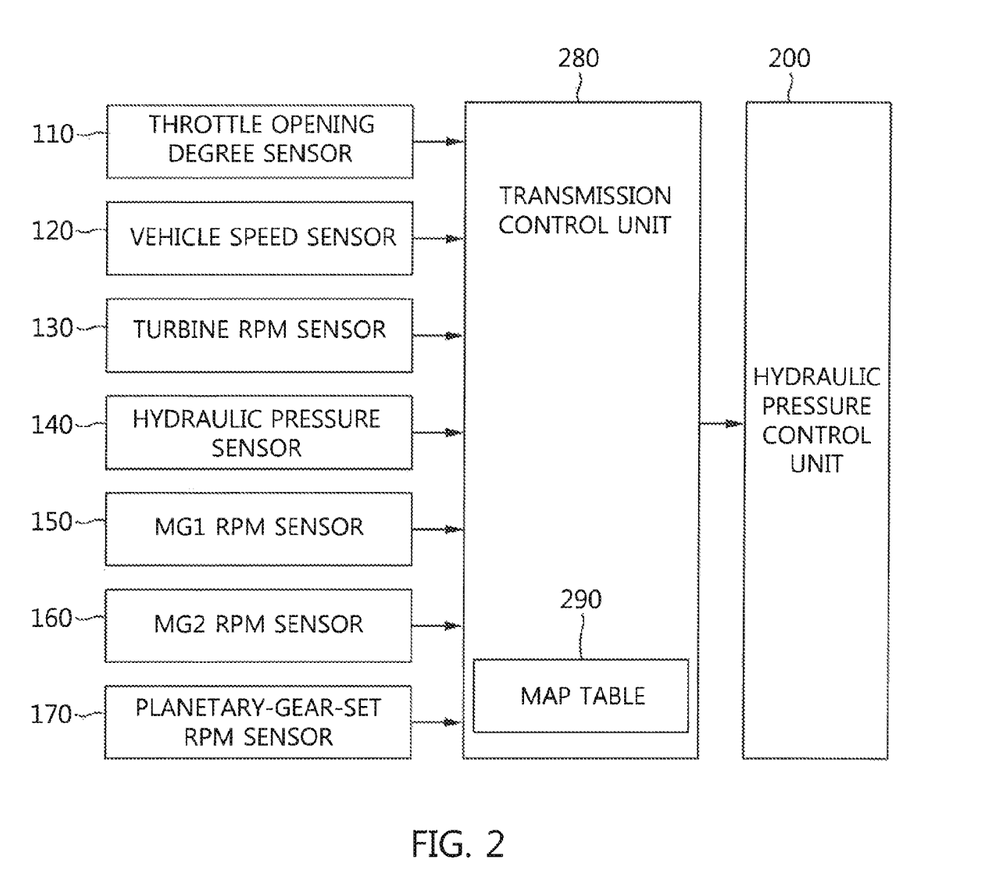
FIG. 2 is a block diagram illustrating a system for conducting a method for controlling gear shifting of an automatic transmission according to the present invention.

FIG. 2 is a block diagram illustrating a system for conducting a method for controlling gear shifting of an automatic transmission according to the present invention.

Referring to FIG. 2, the system for conducting the gear shifting control method according to the present invention includes a throttle opening degree sensor 210, a vehicle speed sensor 220, a turbine rpm sensor 230, a hydraulic pressure sensor 240, an MG1 rpm sensor 250, an MG2 rpm sensor 260, a planetary gear set rpm sensor 270, a transmission control unit 280 and a hydraulic pressure control unit 300.

The throttle opening degree sensor 210 senses variation in the degree of opening of a throttle valve which is operated in response to the degree with which an acceleration pedal is stepped, and then transmits a corresponding sensing signal to the transmission control unit 280.

The vehicle speed sensor 220 senses the speed of the vehicle and transmits a corresponding transmission control unit 280.

The turbine rpm sensor 230 senses, from an angle displacement of a crank shaft, a current rpm of a turbine which is operated by input torque of the transmission, and transmits a corresponding sensing signal to the transmission control unit 280.

The hydraulic pressure sensor 240 senses hydraulic pressures applied to friction elements and transmits corresponding sensing signals to the transmission control unit 280.

In the case where the vehicle provided with the automatic transmission according to the present invention is a hybrid electric vehicle, the output of the engine is used to generate electricity. In this case, the MG1 rpm sensor 250 senses the rpm of a first motor generator MG1 which functions as a drive motor when the engine starts, and transmits a corresponding sensing signal to the transmission control unit 280.

Furthermore, when the vehicle provided with the automatic transmission is a hybrid electric vehicle, the MG2 rpm sensor 260 senses the rpm of a second motor generator MG2 which functions to supplement the output of the engine and generate electricity using regenerative breaking when the vehicle decelerates, and transmits a corresponding sensing signal to the transmission control unit 280.

Provided between the first motor generator MG1 and the second motor generator MG2, the planetary gear set rpm sensor 270 senses the rpm of a planetary gear set for power distribution and transmits a corresponding sensing signal to the transmission control unit 280.

The transmission control unit 280 receives a throttle-opening-degree signal, a vehicle speed signal, a turbine rpm signal, a hydraulic signal, an rpm signal of the first motor generator MG1, an rpm signal of the second motor generator MG2 and an rpm signal of the planetary gear set from the throttle opening degree sensor 210, the vehicle speed sensor 220, the turbine rpm sensor 230, the hydraulic pressure sensor 240, the MG1 rpm sensor 250, the MG2 rpm sensor 260 and the planetary gear set rpm sensor 270, respectively.

In addition, the transmission control unit 280 calculates a current gear ratio based on the vehicle speed and the turbine rpm.

Based on the rpm of the turbine, the rpm of the first motor generator MG1, the rpm of the second motor generator MG2 or the rpm of the planetary gear set, the transmission control unit 280 also sets different synchronous speeds which are used to control engagement and disengagement of the friction elements for conversion from a shift ratio into another shift ratio. For example, if a first synchronous speed is set based on the rpm of the turbine, a second synchronous speed which differs from the first synchronous speed can be set based on any one factor among the rpm of the first motor generator MG1, the rpm of the second motor generator MG2 and the rpm of the planetary gear set rpm sensor that are factors other than the rpm of the turbine.

Among factors of the rpm of the turbine, the rpm of the first motor generator MG1, the rpm of the second motor generator MG2 and the rpm of the planetary gear, factors to be used to set the different synchronous speeds can be previously designated by those skilled in this art in response to specifications of a vehicle or engine to which the gear shifting control method according to the present invention is applied.

The transmission control unit 280 creates hydraulic gear shift signals for the friction elements and transmits the signals to the hydraulic pressure control unit 300.

The transmission control unit 280 includes a map table 290 which stores throttle opening degree values corresponding to vehicle speeds in respective gear stages. The transmission control unit 280 calculates a target gear stage corresponding to the throttle-opening-degree signal and the vehicle speed signal and determines whether gear shift conditions are satisfied. Furthermore, the map table 290 stores engagement pressures and release pressures of the friction elements corresponding to the respective gear stages, and gear ratios corresponding to the respective gear stages.

The hydraulic pressure control unit 300 receives the hydraulic gear shift signals from the transmission control unit 280 and controls hydraulic pressures applied to the respective friction elements.

Hereinafter, the gear shifting control method according to the present invention will be described. In the following description, when a current gear stage of the vehicle denotes an N gear stage, and a desired gear stage that skips three gear ratio steps from the N gear stage denotes an N-3 gear stage, a process of shifting gears from the N gear stage to the N-3 gear stage will be explained as a representative example. The gear shifting control method according to the present invention can be applied not only to the following case where gears are shifted from the N gear stage to the N-3 gear stage but also to every case where gears are shifted from an N gear stage to an N' gear stage, in other words, from a current gear stage of the vehicle to another gear stage other than the current gear stage.

Figure 3:
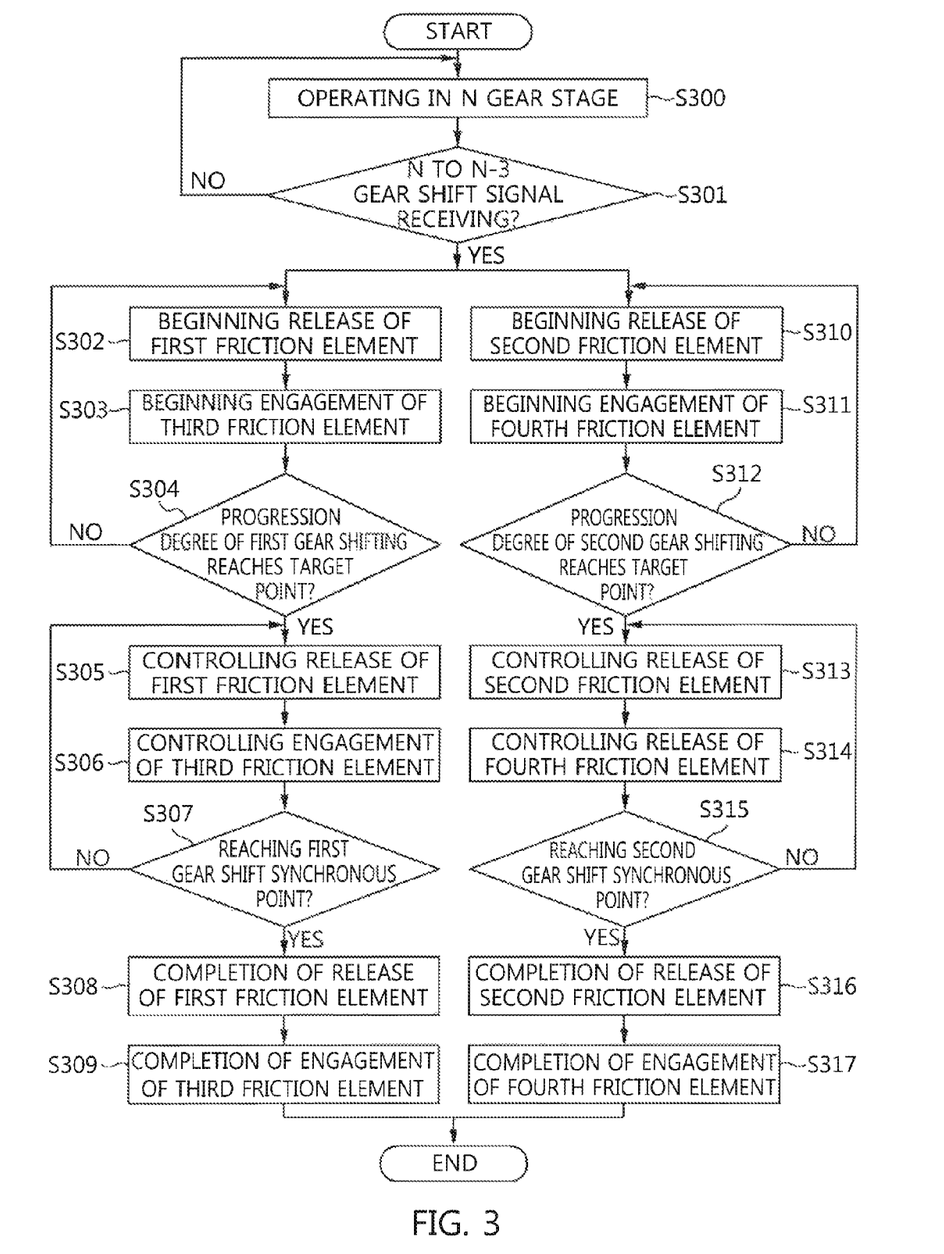
FIG. 3 is a flowchart showing the gear shifting control method according to the present invention.

FIG. 3 is a flowchart showing the gear shifting control method according to the present invention.

In the automatic transmission, in the case of a skip shift where three or more gear ratios are skipped, typically, two friction elements are released, and the other two friction elements are engaged. If the N gear stage is embodied by engagement of first and second friction elements and the N-3 gear stage is embodied by engagement of third and fourth friction elements, when the current N gear stage is shifted to the N-3 gear stage, release of the first friction element and engagement of the third friction element are controlled, and release of the second friction element and engagement of the fourth friction element are controlled.

The gear shifting control method according to the present invention is characterized in that the first synchronous speed is used to control the release of the first friction element and the engagement of the third friction element, and the second synchronous speed that differs from the first synchronous speed is separately used to control the release of the second friction element and the engagement of the fourth friction element.

Each of the first synchronous speed and the second synchronous speed is set based on the rpm of the turbine, the rpm of the first motor generator MG1, the rpm of the second motor generator MG2 or the rpm of the planetary gear set. The first and second synchronous speeds are set to different speeds. For example, if the first synchronous speed is set based on the rpm of the turbine, the second synchronous speed that differs from the first synchronous speed is set based on any one factor among the rpm of the first motor generator MG1, the rpm of the second motor generator MG2 and the rpm of the planetary gear set, other than the rpm of the turbine.

Therefore, when the current N gear stage is shifted to the N-3 gear stage, the release of the first friction element and the engagement of the third friction element with respect to the set first synchronous speed are controlled, and the release of the second friction element and the engagement of the fourth friction element with respect to the second synchronous speed can be separately controlled. Thus, when the current N gear stage is shifted to the N-3 gear stage, controlling the release of the first friction element and the engagement of the third friction element and controlling the release of the second friction element and the engagement of the fourth friction element can be conducted at the same time.

Referring to FIG. 3, in the gear shifting control method according to the present invention, while the vehicle is operated in the N gear stage (at step S300), the transmission control unit 280 determines whether it receives an N to N-3 gear shift signal from the N gear stage to the N-3 gear stage (at step S301). The N to N-3 gear shift signal is created when the throttle opening degree corresponding to the speed of the vehicle is a preset throttle opening degree value or more.

Unless the transmission control unit 280 receives the N to N-3 gear shift signal, the vehicle is continuously operated in the N gear stage (at step S300). If the transmission control unit 280 receives the N to N-3 gear shift signal, the transmission control unit 280 begins release of the first friction element (at step S302) and begins engagement of the third friction element (at step S303). The release of the first friction element and the engagement of the third friction element can be begun at the same time.

The words "start of the release and engagement of the friction elements" refers to starting control of hydraulic pressure of each friction element. In other words, the start of the release of the friction element means that hydraulic pressure that is applied to the friction element is gradually or rapidly reduced to "0". The start of the engagement of the friction element e means that the hydraulic pressure that is applied to the friction element is gradually or rapidly increased to an engagement pressure.

The transmission control unit 280 calculates, with regard to the first synchronous speed that is used for a preset gear shift, a progression degree of the gear shift from the N gear stage to the N-3 gear stage based on the one control factor that has been the basis of setting the first synchronous speed among the rpm of the turbine, the rpm of the first motor generator MG1, the rpm of the second motor generator MG2 and the rpm of the planetary gear set, and then determines whether the calculated progression degree of the gear shift reaches a target point of the progression degree of first gear shifting (at step S304).

Figure 4:
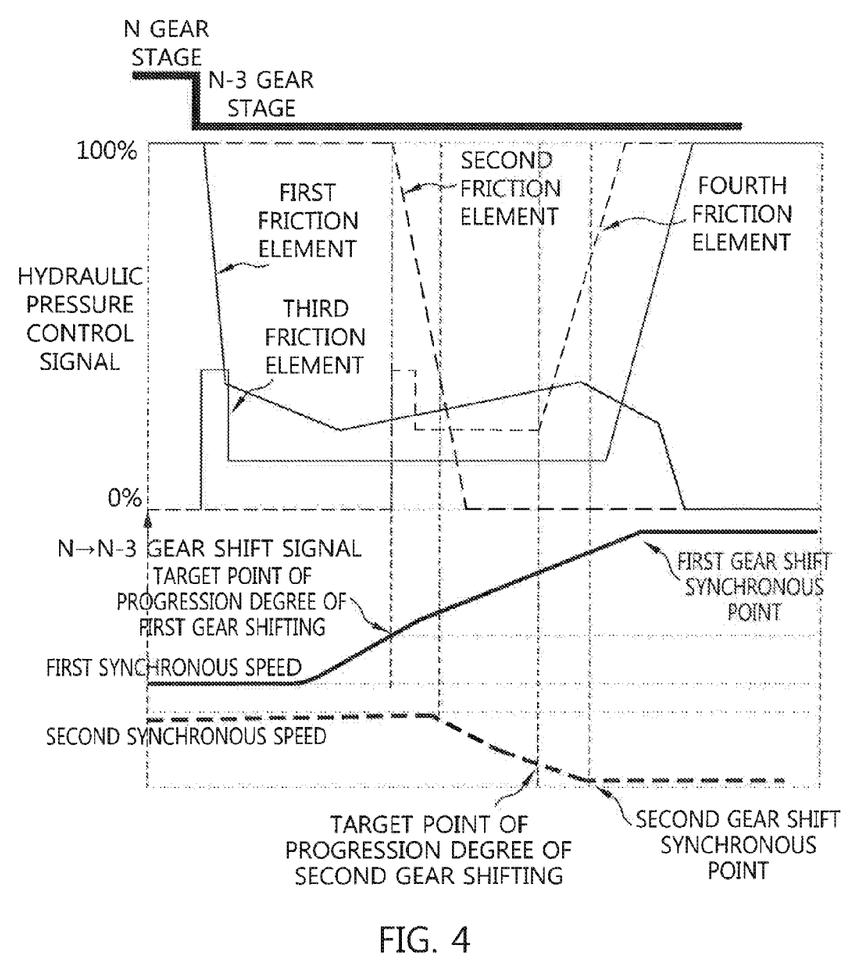
FIGS. 4 and 5 are graphs showing variation in hydraulic pressure control signals of friction elements as a function of a first synchronous speed and a second synchronous speed in the gear shifting control method according to the present invention.
Figure 5:
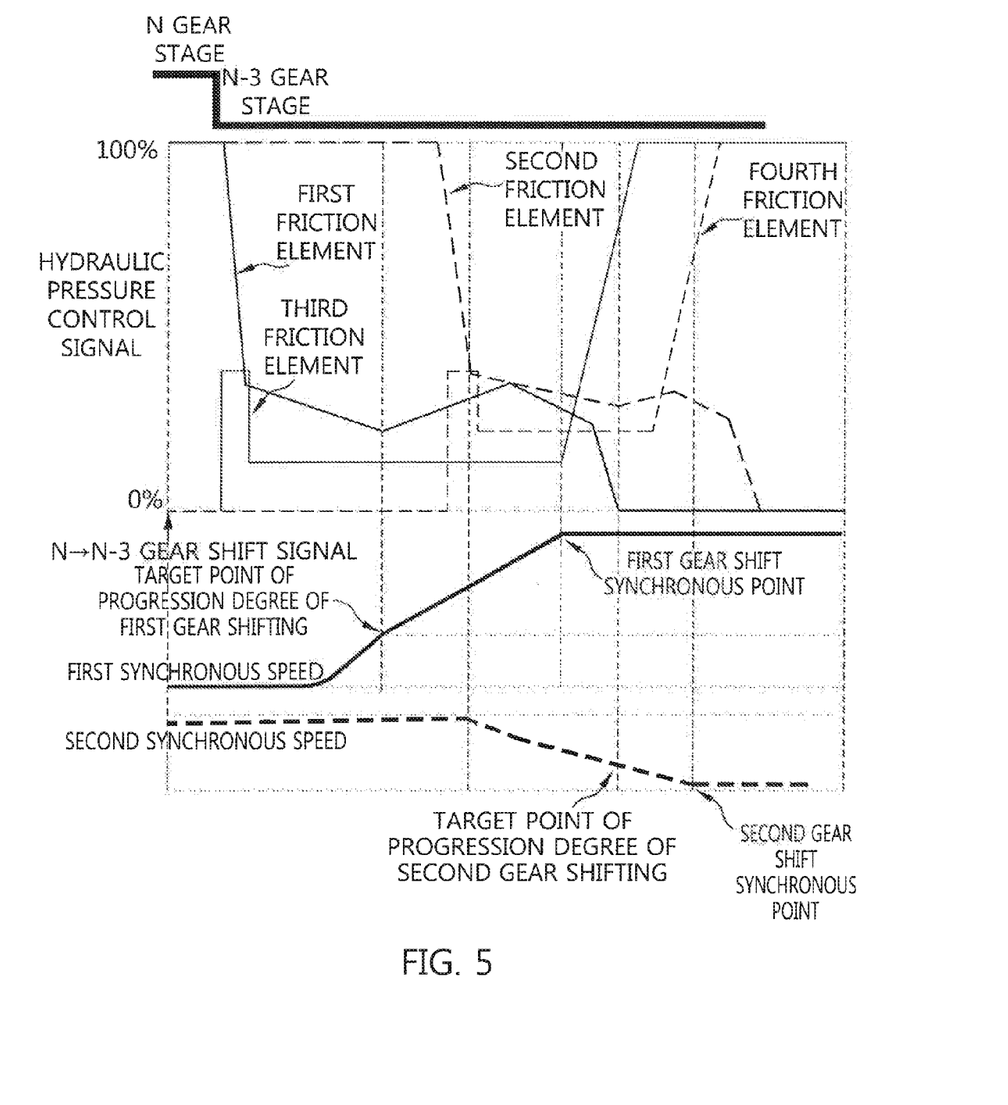

As shown in FIGS. 4 and 5, the target point of the progression degree of first gear shifting is a predetermined speed which is below the first gear shift synchronous point, and it can be preset to an appropriate value by those skilled in this art in response to the specifications of the vehicle or engine to which the gear shifting control method according to the present invention is applied.

From the result of determination at step S304, if the calculated progression degree of the gear shift does not reach the target point of the progression degree of the first gear shifting, the transmission control unit 280 continuously conducts the release of the first friction element and the engagement of the third friction element. If, from the result of determination at step S304, the calculated progression degree of the gear shift reaches the target point of the progression degree of the first gear shifting, the transmission control unit 280 controls the release of the first friction element (at step S305) and controls the engagement of the third friction element (at step S306) such that the progression degree of the gear shift reaches the first gear shift synchronous point.

Subsequently, as the transmission control unit 280 controls the release of the first friction element at step S305 and controls the engagement of the third friction element at step S306, it is determined whether the progression degree of the gear shift reaches the first gear shift synchronous point (at step S307).

From the result of determination of step S307, if the progression degree of the gear shift does not reach the first gear shift synchronous point, the transmission control unit 280 continuously conducts the control for the release of the first friction element and the control for the engagement of the third friction element until the progression degree of the gear shift reaches the first gear shift synchronous point. If from the result of determination of step S307, the progression degree of the gear shift reaches the first gear shift synchronous point, the transmission control unit 280 completes the release of the first friction element (at step S308) and completes the engagement of the third friction element (at step S309). In other words, hydraulic pressure that is applied to the first friction element is reduced to "0", and hydraulic pressure that is applied to the third friction element is increased to the engagement pressure.

Meanwhile, when, at step S301, the transmission control unit 280 receives the N to N-3 gear shift signal, the operations of step S310 through S317 are conducted as a control process for the release of the second friction element and the engagement of the fourth friction element with reference to the second synchronous speed in parallel with conducting the operations of step S302 through S309 which are operations of controlling the release of the first friction element and the engagement of the third friction element with regard to the first synchronous speed until the release of the first friction element and the engagement of the third friction element are completed after having started.

From the result of determination at step S301, if the transmission control unit 280 receives the N to N-3 gear shift signal, the transmission control unit 280 begins release of the second friction element (at step S310) and begins engagement of the fourth friction element (at step S311). The release of the second friction element and the engagement of the fourth friction element can be begun at the same time.

Subsequently, the transmission control unit 280 calculates, with regard to the second synchronous speed that is used for a preset gear shift, a progression degree of the gear shift from the N gear stage to the N-3 gear stage based on the one control factor that has been the basis of setting the second synchronous speed among the rpm of the turbine, the rpm of the first motor generator MG1, the rpm of the second motor generator MG2 and the rpm of the planetary gear set, and then determines whether the calculated progression degree of the gear shift reaches a target point of the progression degree of second gear shifting (at step S312).

Here, as shown in FIGS. 4 and 5, the target point of the progression degree of second gear shifting is a predetermined speed which is below the second gear shift synchronous point, and it can be preset to an appropriate value by those skilled in this art in response to the specifications of the vehicle or engine to which the gear shifting control method according to the present invention is applied.

From the result of determination at step S312, if the calculated progression degree of the gear shill does not reach the target point of the progression degree of the second gear shifting, the transmission control unit 280 continuously conducts the release of the second friction element and the engagement of the fourth friction element. If, from the result of determination at step S312, the calculated progression degree of the gear shift reaches the target point of the progression degree of the second gear shifting, the transmission control unit 280 controls the release of the second friction element (at step S313) and controls the engagement of the fourth friction element (at step S314) such that the progression degree of the gear shift reaches the second gear shill synchronous point.

Subsequently, as the transmission control unit 280 controls the release of the second friction element at step S313 and controls the engagement of the fourth friction element at step S314, it is determined whether the progression degree of the gear shift reaches the second gear shift synchronous point (at step S315).

From the result of determination of step S315, if the progression degree of the gear shift does not reach the second gear shift synchronous point, the transmission control unit 280 continuously conducts the control for the release of the second friction element and the control for the engagement of the fourth friction element until the progression degree of the gear shift reaches the second gear shift synchronous point. If, from the result of determination of step S315, the progression degree of the gear shift reaches the second gear shift synchronous point, the transmission control unit 280 completes the release of the second friction element (at step S316) and completes the engagement of the fourth friction element (at step S317). In other words, hydraulic pressure that is applied to the second friction element is reduced to "0", and hydraulic pressure that is applied to the fourth friction element is increased to the engagement pressure.

FIGS. 4 and 5 are graphs showing variation in hydraulic pressure control signals of the friction elements as a function of the first synchronous speed and the second synchronous speed in the gear shifting control method according to the present invention.

FIG. 4 shows variation of the hydraulic pressure control signals of the friction elements in the case where the progression degree of the gear shift reaches the second gear shift synchronous point on the second synchronous speed before reaching the first gear shift synchronous point on the first synchronous speed. FIG. 5 shows variation of the hydraulic pressure control signals of the friction elements in the case where the progression degree of the gear shift reaches the first gear shift synchronous point on the first synchronous speed before reaching the second gear shift synchronous point on the second synchronous speed.

In the case where the progression degree of the gear shift reaches the second gear shift synchronous point on the second synchronous speed before reaching the first gear shift synchronous point on the first synchronous speed, referring to FIG. 4, as it first reaches the second gear shift synchronous point on the second synchronous speed, the hydraulic pressure applied to the second friction element is reduced to "0" so that the release of the second friction element is completed, and the hydraulic pressure applied to the fourth friction element is increased to the engagement pressure, thus completing the engagement of the fourth friction element. Thereafter, when the progression degree reaches the first gear shift synchronous point on the first synchronous speed, the hydraulic pressure applied to the first friction element is reduced to "0" so that the release of the first friction element is completed, and the hydraulic pressure applied to the third friction element is increased to the engagement pressure, thus completing the engagement of the third friction element.

On the other hand, in the case where the progression degree of the gear shift reaches the first gear shift synchronous point on the first synchronous speed before reaching the second gear shift synchronous point on the second synchronous speed, referring to FIG. 5, as it first reaches the first gear shift synchronous point on the first synchronous speed, the hydraulic pressure applied to the first friction element is reduced to "0" so that the release of the first friction element is completed, and the hydraulic pressure applied to the third friction element is increased to the engagement pressure, thus completing the engagement of the third friction element. Thereafter, when the progression degree reaches the second gear shift synchronous point on the second synchronous speed, the hydraulic pressure applied to the second friction element is reduced to "0" so that the release of the second friction element is completed, and the hydraulic pressure applied to the fourth friction element is increased to the engagement pressure, thus completing the engagement of the fourth friction element.

As described above, the preferred embodiment of the present invention has been disclosed with reference to the attached drawings. In the above embodiment, although the specific terms have been used, they are for the purpose of describing particular embodiment only and are not intended to be limiting or to limit the bounds of the present invention. Therefore, those skilled to this art will be able to easily understand that various modifications, additions and substitutions are possible, without departing from the scope and spirit of the invention.

What is claimed is:

1. A method for controlling gear shifting of an automatic transmission from a N gear stage to a N' gear stage, the gear shifting being embodied by engaging and releasing friction elements, the method comprising:
selecting at least two among a rpm of a turbine, a rpm of a first motor generator (MG1), a rpm of a second motor generator (MG2) and a rpm of a planetary gear set as control factors;
controlling engagement and release of the friction elements using the control factors;
setting a first synchronous speed and a second synchronous speed for controlling the engagement and release of the friction elements using the two control factors selected from among the rpm of the turbine, the rpm of the first motor generator (MG1), the rpm of the second motor generator (MG2) and the rpm of the planetary gear set, the first and second synchronous speeds being different from each other;
wherein when a signal of shifting gears from the N gear stage embodied by engagement of a first friction element and a second friction element to the N' gear stage embodied by engagement of a third friction element and a fourth friction element is input, the release of the first friction element and the engagement of the third friction element begin at the same time, and the release of the second friction element and the engagement of the fourth friction element begin at the same time; and
wherein when the signal of shifting gears from the N gear stage embodied by engagement of the first friction element and the second friction element to the N' gear stage embodied by engagement of the third friction element and the fourth friction element is input, controlling the release of the first friction element and the engagement of the third friction element and controlling the release of the second friction element and the engagement of the fourth friction element are conducted at the same time.

2. The method as set forth in claim 1, wherein when the first synchronous speed reaches a first gear shift synchronous point, the release of the first friction element and the engagement of the third friction element are completed.

3. The method as set forth in claim 2, wherein, with respect to the first synchronous speed, a target point of a progression degree of first gear shifting is set, and the release of the first friction element and the engagement of the third friction element are controlled based on determining whether the first synchronous speed reaches the target point of the progression degree of the first gear shifting, and
with respect to the second synchronous speed, a target point of a progression degree of second gear shifting is set, and the release of the second friction element and the engagement of the fourth friction element are controlled based on determining whether the second synchronous speed reaches the target point of the progression degree of the second gear shifting.

4. The method as set forth in claim 1, wherein when the second synchronous speed reaches a second gear shift synchronous point, the release of the second friction element and the engagement of the fourth friction element are completed.

5. The method as set forth in claim 4, wherein, with respect to the first synchronous speed, a target point of a progression degree of first gear shifting is set, and the release of the first friction element and the engagement of the third friction element are controlled based on determining whether the first synchronous speed reaches the target point of the progression degree of the first gear shifting, and
with respect to the second synchronous speed, a target point of a progression degree of second gear shifting is set, and the release of the second friction element and the engagement of the fourth friction element are controlled based on determining whether the second synchronous speed reaches the target point of the progression degree of the second gear shifting.

* * * * *